INVENTORS:
ERWIN BÜHRER
BY ERNST BOSSHARD

Jan. 31, 1961  E. BÜHRER ET AL  2,969,967
WASTE GAS RECUPERATOR
Filed Oct. 25, 1957  2 Sheets-Sheet 2

INVENTORS:
ERWIN BÜHRER
ERNST BOSSHARD
BY
AGT.

United States Patent Office 2,969,967
Patented Jan. 31, 1961

2,969,967
WASTE GAS RECUPERATOR

Erwin Bührer, Schaffhausen, and Ernst Bosshard, Feuerthalen, Switzerland, assignors to Georg Fischer Aktiengesellschaft, Schaffhausen, Switzerland, a company of Switzerland Filed Oct. 25, 1957, Ser. No. 692,306

Claims priority, application Switzerland Oct. 27, 1956

6 Claims. (Cl. 263—20)

The present invention relates to a recuperator for cupola and blast furnaces and more particularly to a recuperator for preheating blast air by means of hot waste gas heat exchange.

It is an object of the present invention, to provide for means conducive to the exchange of heat from hot waste gas to blast air to be preheated, in a simplified yet highly efficient manner.

A further object of the present invention is the provision of means for the exchange of heat between hot waste gas and blast air to be preheated, which are not subject to deterioration, due to temperature changes present therein.

Another object of the present invention is the provision of means for the exchange of heat which permit a free expansion and contraction of a plurality of parts under the influence of changes in temperature.

Still another object of the present invention is to provide means in a recuperator conducive to the separation of dust from the hot waste gas passing therethrough.

Another object of the present invention is the provision of means in a recuperator permitting combustion or afterburning of the waste gas with a minimum of heat losses.

A further object of the present invention is to provide a recuperator of relatively small external dimensions.

Another object of the present invention is the provision of a recuperator, having a plurality of heat exchange surfaces surrounding each other in substantially equidistant relation.

Still a further object of the present invention is the provision of recuperator operating at very high velocities in the blast air as well as in the waste gas flow and having consequently very high heat transfer coefficients.

Another object of the present invention is the provision of a recuperator providing aerodynamically favourable conditions for the flow of hot waste gas and blast air therethrough and having a minimum of obstructions and resistance of this flow.

A still further object of the invention is the provision of a recuperator reducing substantially the deposition of foreign matter on the walls thereof and consequently avoiding the necessity of regularly cleaning the same.

These and other objects will become further apparent from the following description taken in connection with the accompanying drawings which illustrates a preferred embodiment of the present invention.

Referring generally to the invention it will be seen that a plurality of substantially vertically extending heat exchange chambers are being provided, each one of which has at least two portions and all of the portions surrounding each other. In the case of two chambers, i.e. one for the circulation of hot waste gas and the other for the circulation of blast air, the portions of the one chamber surround the portions of the other chamber externally and internally, respectively.

Figure 1:
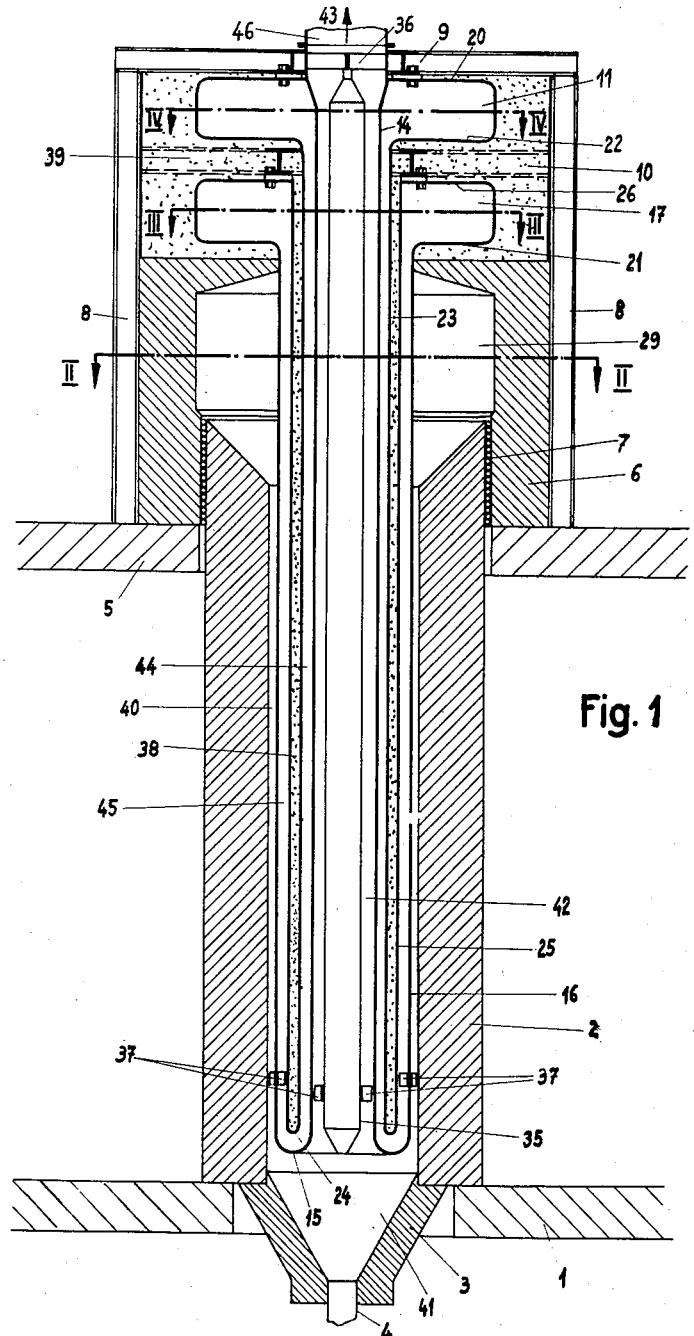
Fig. 1 shows a recuperator embodying the invention, in vertical section taken along line I—I in Fig. 2.
Figure 2:
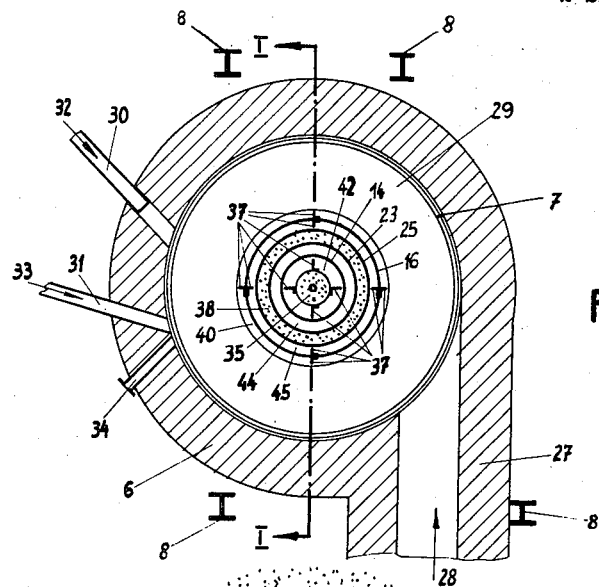
Fig. 2 is a horizontal section taken along line II—II in Fig. 1.
Figure 3:
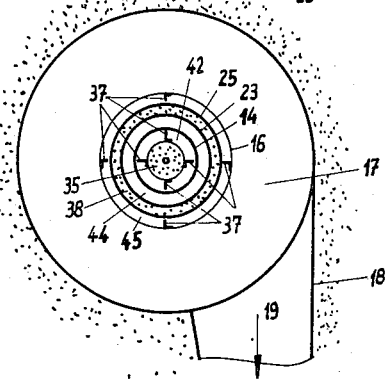
Fig. 3 is a fragmentary horizontal section taken along line III—III in Fig. 1.
Figure 4:
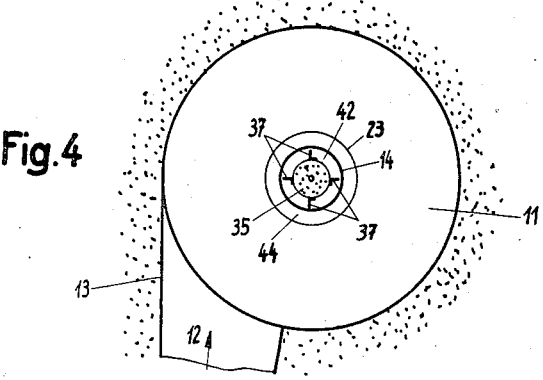
Fig. 4 is a fragmentary horizontal section taken along line IV—IV in Fig. 1.

Referring now in particular to Fig. 1 of the drawing. Resting on the melting floor 1 is a hollow body 2 to which at the lower end thereof a conical closure member 3 holding a discharging tube 4 is attached. Resting on the charging floor 5 situated above melting floor 1, is a second hollow body 6 which overlaps and covers the hollow body 2. The overlap joint 7 is sealed by means of asbestos braids. Section-iron columns 8 resting on the charging floor 5 support both a supporting member 9 and a supporting member 10. Connected to the supporting member 9 is an annular inlet chamber 11, while supporting member 10 carries an annular outlet chamber 17. The blast to be preheated is tangentially passed into the annular inlet chamber 11 in the direction of arrow 12 through an inlet pipe 13. Attached to the top portion 20 of annular chamber 11 is an inner tube 14 which extends downwardly into the vicinity of the conical closure 3 and is there connected with an outer tube 16 via an end piece 15. The outer tube 16 joins with its upper end the bottom portion 21 of the annular chamber 17. The lower annular chamber 17 is provided with an outlet pipe 18 through which the preheated blast emerges from the recuperator in the direction of arrow 19. Attached to the bottom portion 22 of annular chamber 11 is a tube 23 which is connected with the tube 25 via an end piece 24; tube 25 being suspended from the top portion 26 of annular chamber 17. The hollow body 6 forms an inlet 27 through which the waste gas from a furnace (not shown) enter the afterburning chamber 29, provided in this body, in the direction of arrow 28. Connected to the afterburning chamber 29 is an air supply tube 30 through which the air can enter in this chamber the direction of arrow 32, and a gas supply tube 31 through which the gas is injected in the direction of arrow 33. A further tube 34 serves as a flash vent or ignition opening. Combustion of a very small quantity of gas merely serves to obtain a pilot flame. A closed cylinder 35 serving as a radiator is attached to the supporting member 9 via a cross structure 36, made of flat irons. In order to ensure that all tubes maintain a concentric relation with respect to hollow body 2, slide guides 37 are provided intermediate certain of these tubes. The annular space between tubes 23 and 25 is filled with an insulating material 38. The entire space above hollow body 6 is stuffed with an insulating material 39 in order to prevent heat from being dissipated from the annular chambers 11 and 17.

The recuperator according to the present invention operates as follows:

The uncleaned exhaust gases of a furnace which may be of the cupola or blast type enter the afterburning chamber 29 in the direction of arrow 28. Owing to the tangential direction of inlet 27 with respect to chamber 29, the exhaust gases circulate in the afterburning chamber 29 several times and are ignited by the gas flame established at the end of the gas supply tube 31 by ignition through opening 34. From the afterburning chamber 29 the heat radiates towards the top portion of outer tube 16 while the hollow body 6 allows only small amounts of heat to be transmitted to the exterior owing to insulation characteristic of its wall material or lining. After leaving the afterburning or combustion chamber 29, the hot exhaust gases, which are completely burnt but still contain dust, leave the annular chamber 40 between the hollow body 2 and the outer tube 16 at a high rate of speed, and owing to the rotational movement in the said afterburning chamber 29 they emerge in a helical line. When entering chamber 41 the exhaust gases are deflected as in a cyclone and flow through annular chamber 42 formed by the inner tube 14 and the cylinder 35, in the upward direction. When deflected in chamber 41, the dust is separated from the gas and emerges through the discharging tube 4 from the recuperator. The hot exhaust gases accordingly transmit their heat first to the outer tube 16 and subsequently to the connecting piece 15 and the inner tube 14. The cooled exhaust gases emerge from the recuperator in the direction of arrow 43 and are exhausted by an exhaust gas fan (not shown).

The blast air to be preheated enters the annular chamber 11 through the inlet pipe 13 in the direction of arrow 12. It then flows through annular chamber 44 formed by the inner tube 14 and the tube 23, in the downward direction, and through the annular chamber 45 formed by the tube 25 and the outer tube 16, in the upward direction, to emerge through annular chamber 17 in the direction of arrow 19. Heat absorption occurs through inner tube 14 and subsequently through outer tube 16. The insulation 38 is designed to prevent heat of the hotter air in annular chamber 45 from passing to the colder air in annular chamber 44.

When the recuperator is set into operation, the outer tube 16 and the inner tube 14 can jointly expand in the downward direction. The difference in the thermal expansion of these two tubes 14 and 16 is taken up by the bottom portion 21 and the top portion 26 which serve as diaphragms. Similarly, the tubes 23 and 25 can jointly and freely expand in the downward direction. The difference in the expansion of the two tubes 23 and 25 is taken up by the top portion 20 and the bottom portion 22. In order to clean the inner tube 14, which becomes necessary only rarely, the tube section 46 can be removed to render the inner tube 14 accessible. Dust removed in cleaning is then passed into the discharge tube 4 through the conical closure. If the outer tube 16 requires cleaning, which is necessary in practice after long periods of operation only, the conical closure 3 can be removed to gain access to the annular chamber 45 from below.

The recuperator according to the present invention has, inter alia, the following advantages over the known designs:

Owing to the fact that the inner tube 14 and the outer tube 16 are concentrically arranged and since both constitute heat-exchanging surfaces, the length of the recuperator is substantially shortened as compared to the conventional designs. The same result is furthered by the fact that high speeds of flow may be maintained not only on the blast side but also on the gas side, so that very good heat transfer coefficients may be obtained and the heat transferring surfaces may be relatively small. This is possible because, owing to the aerodynamically favourable flow conditions, a relatively small drop in pressure occurs even at high rates of flow.

As the concentrically arranged tubes can expend freely, they are not subject to cracking.

Since the afterburning chamber can be directly incorporated in the recuperator, the latter requires very little space and the thermal losses are very small.

Because of the dust separation effected in the recuperator, further removal of dust from the exhaust gases from the cupola furnace can very often be dispensed with.

Owing to the fact that the smooth, vertical tubes employed are not apt to be soiled, thanks to the high flow rates of the exhaust gases, cleaning is required infrequently and can be effected with ease due to the simple design.

Various changes and modifications may be made without departing from the spirit and scope of the present invention, and it is intended that such obvious changes and modifications be embraced by the annexed claims.

Having thus described the invention, what is claimed as new and desired to be secured by Letters Patent is:

1. Recuperator for hot waste gases of cupola and blast furnaces, comprising two heat exchange chambers, one of said chambers serving to circulate hot waste gas, the other of said chambers serving to circulate blast air, each one of said chambers including an inner and an outer vertically extending annular portion having two ends, said outer portion of said waste gas chamber concentrically surrounding said outer portion of said blast air chamber in heat exchanging relation, said inner portion of said waste gas chamber being located internally of said inner portion of said blast air chamber and arranged in concentrical and heat exchanging relation therewith, said inner portions being surrounded concentrically by said outer portions, said outer portions of said respective chambers communicating with said inner portions thereof at adjacent ends of said respective portions, said communicating ends of said portions of said waste gas chamber being located immediately adjacent and externally of said communicating ends of said portions of said blast air chamber, an annular combustion chamber for said waste gas connected to said outer portion of said waste gas chamber at said end opposite said communicating end, said combustion chamber having a waste gas inlet, an inlet opening for said blast air chamber provided at said end opposite said communicating end of said inner portion thereof, and respective outlet openings for said waste gas chamber and said blast air chamber provided at said ends opposite said communicating ends of said inner and outer portion thereof, respectively, for supplying and removing hot waste gas and blast air to and from said respective chambers, respectively, whereby hot waste gas is circulated exteriorly and interiorly of blast air to thereby heat said latter.

2. A recuperator for hot waste gases of cupola and blast furnaces, comprising two heat exchange chambers one of said chambers serving to circulate hot waste gas, the other of said chambers serving to circulate blast air, each one of said chambers including an inner and an outer vertically extending annular portion having two ends, said outer portion of said waste gas chamber concentrically surrounding said outer portion of said blast air chamber in heat exchanging relation, said inner portion of said waste gas chamber being located internally of said inner portion of said blast air chamber and arranged in concentrical and heat exchanging relation therewith, said inner portions being surrounded concentrically by said outer portions, said outer portions of said respective chambers communicating with said inner portions thereof at adjacent ends of said respective portions, said communicating ends of said portions of said waste gas chamber being located immediately adjacent and externally of said communicating ends of said portions of said blast air chamber, a conical separation chamber adjacent to and connected with said communicating ends of said portions of said waste gas chamber to separate dust from said waste gas circulated through said waste gas chamber, said separation chamber having an opening for removing said separated dust therefrom, respective inlet openings for said waste gas chamber and said blast air chamber provided at said ends opposite said communicating ends of said outer and inner portion thereof, respectively, and respective outlet openings for said waste gas chamber and said blast air chamber provided at said ends opposite said communicating ends of said inner and outer portion thereof, respectively, for supplying and removing hot waste gas and blast air to and from said respective chambers, respectively, whereby hot waste gas is circulated exteriorly and interiorly of said blast air to thereby heat said latter.

3. A recuperator according to claim 2, wherein said separation chamber is formed by a conical casing, said recuperator having an exterior wall, said conical casing being removably attached to said exterior wall.

4. A recuperator for hot waste gases of metal working furnaces; comprising at least two heat exchange chambers, each one of said chambers including an inner and an outer longitudinally extending portion having two ends, said outer portion of one of said chambers surrounding said outer portion of the other of said chambers, said inner portion of one of said chambers being located internally of said inner portion of the other of said chambers, said inner portions being surrounded by said outer portions, said outer portions of said respective chambers communicating with said inner portions thereof at adjacent ends of said respective portions, said communicating ends of said portions of said one chamber being located immediately adjacent said communicating ends of said portions of said outer chamber, respective inlet and outlet openings for each of said chambers provided at said ends of said respective portions opposite said communicating ends, for supplying to and removing from one of said chambers hot waste gases and for supplying to and removing from the other of said chambers a gaseous medium of lower temperature than said hot gases, respectively, to thereby heat with said hot waste gases circulated in said one chamber said gaseous medium circulated in said other chamber, and separator means located adjacent said communicating ends of said portions of said one chamber to thereby remove from said hot waste gases dust and the like particles.

5. A recuperator according to claim 4, wherein said separator means are formed by a conical chamber having outlet means for said particles removed from said hot waste gases.

6. A recuperator for hot waste gases of metal working furnaces; comprising two heat exchange chambers, one of said chambers serving to circulate hot waste gas, the other of said chambers serving to circulate blast air, each one of said chambers including an inner and an outer vertically extending annular portion having two ends, said outer portion of said waste gas chamber concentrically surrounding said outer portion of said blast air chamber in heat exchanging relation, said inner portion of said waste gas chamber being located internally of said inner portion of said blast air chamber and arranged in concentrical and heat exchanging relation therewith, said inner portions being surrounded concentrically by said outer portions, said outer portions of said respective chambers communicating with said inner portions thereof at adjacent ends of said respective portions, said communicating ends of said portions of said waste gas chamber being located immediately adjacent and externally of said communicating ends of said portions of said blast air chamber, an annular combustion chamber for said waste gas connected to said outer portion of said waste gas chamber at said end opposite said communicating end, said combustion chamber having a waste gas inlet, said blast air chamber being provided with an inlet opening at said end opposite said communicating end of said inner portion thereof, respective outlet openings for said waste gas chamber and said blast air chamber provided at said ends opposite said communicating ends of said inner and outer portion thereof, respectively, for supplying and removing hot waste gas and blast air to and from said respective chambers, respectively, whereby hot waste gas is circulated exteriorly and interiorly of blast air to thereby heat said latter, and a separation chamber adjacent to and connected with said communicating ends of said portions of said waste gas chamber to separate dust from said waste gas circulated through said waste gas chamber, said separation chamber having an opening for removing said separated dust therefrom.

References Cited in the file of this patent

UNITED STATES PATENTS

| | | |
|---|---|---|
| 103,651 | Player | May 31, 1870 |
| 1,826,750 | Demers | Oct. 13, 1931 |
| 2,686,048 | Peck et al. | Aug. 10, 1954 |